United States Patent [19]
Long et al.

[11] Patent Number: 5,829,253
[45] Date of Patent: Nov. 3, 1998

[54] SINGLE ACTUATION PUSHING DEVICE DRIVEN BY A MATERIAL WITH FORM MEMORY

[75] Inventors: Christian Fernand Louis Long, Montauroux; Gérard Albert Pierre Vezain, Mandelieu, both of France

[73] Assignee: Societe Nationale Industrielle et Aerospatiale, Paris Cedex, France

[21] Appl. No.: 776,591

[22] PCT Filed: Jun. 5, 1996

[86] PCT No.: PCT/FR96/00846

§ 371 Date: Mar. 26, 1997

§ 102(e) Date: Mar. 26, 1997

[87] PCT Pub. No.: WO96/39580

PCT Pub. Date: Dec. 12, 1996

[30] Foreign Application Priority Data

Jun. 6, 1995 [FR] France .................................. 95 06641

[51] Int. Cl.⁶ ..................................................... F01B 29/10
[52] U.S. Cl. ............................................. 60/528; 411/909
[58] Field of Search ..................... 60/527, 528; 411/909; 403/28; 294/86.4

[56] References Cited

U.S. PATENT DOCUMENTS

| | | | |
|---|---|---|---|
| 5,160,233 | 11/1992 | McKinnis | 411/909 |
| 5,248,233 | 9/1993 | Webster | 411/909 |
| 5,312,152 | 5/1994 | Woebkenberg, Jr. et al. | 60/528 |

*Primary Examiner*—Noah P. Kamen
*Attorney, Agent, or Firm*—Oblon, Spivak, McClelland, Maier & Neustadt, P.C.

[57] ABSTRACT

To command notably the unclamping and the separation of two components, on a spacecraft, such as a satellite or a probe, a single actuation pushing device (10) is driven by a form memory device (36) positioned in a casing (12), between a wall (18) of the latter and a boss (24). It is linked to a heater (38). A system to prevent mistakes (20, 26, 32), sensitive to a displacement of the component (24) caused by an elongation of the device (36), prevents assembly of the pushing device (10) when it has already been actuated.

15 Claims, 4 Drawing Sheets

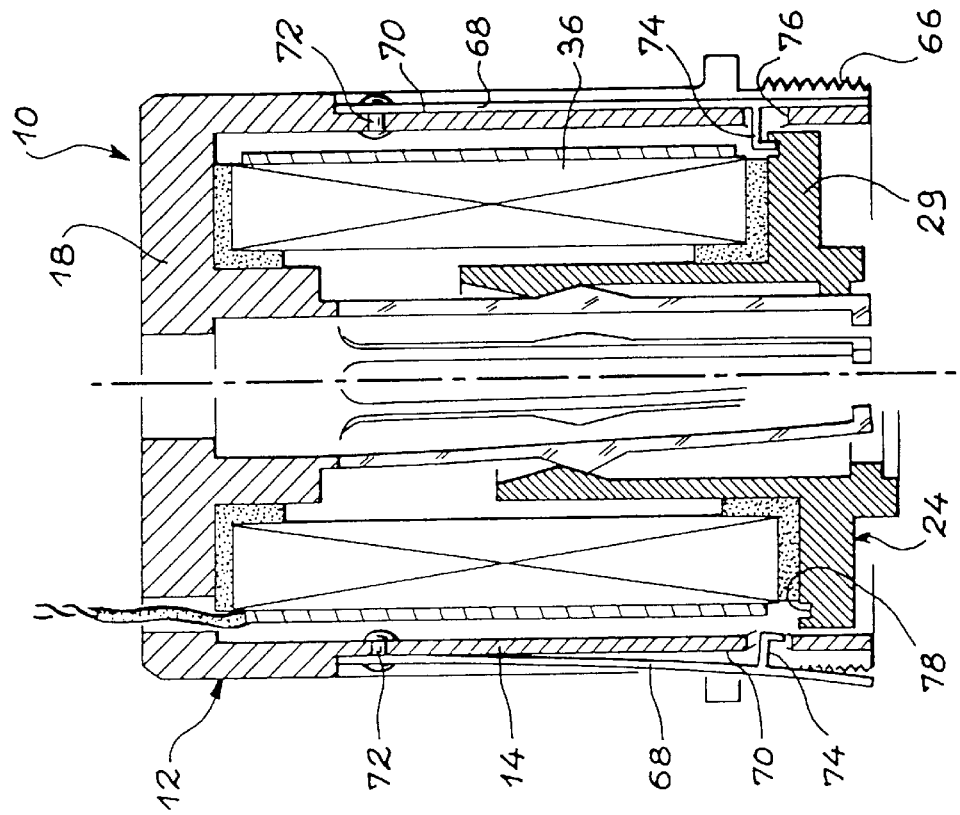
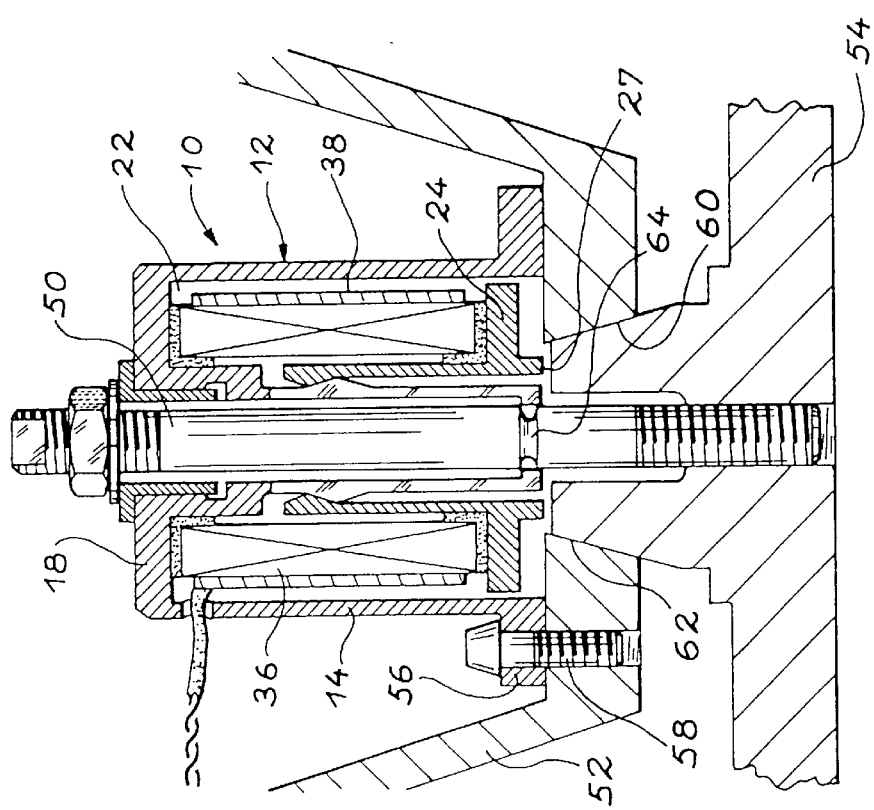
FIG. 2
FIG. 3

0
SINGLE ACTUATION PUSHING DEVICE DRIVEN BY A MATERIAL WITH FORM MEMORY

BACKGROUND OF THE INVENTION

1. Field of the Invention

The invention relates to a pushing device driven by a material with form memory, in such a way that it can only be actuated once.

Such a pushing device can be used in numerous industrial fields whenever one wishes to be able to command a single and irreversible relative movement between two components, of limited amplitude, in a sure and effective fashion and without causing any impact.

One important application relates to the space industry and notably the carrying out of operations such as the locking of a hinged coupling, without any play, after deployment of an appendage such as an antenna reflector, or a solar generator panel. Furthermore, the present invention can prevent the disengaging of components immobilized with respect to one another during the launch of the spacecraft, and the possible separation of surfaces of these components that are in contact.

2. State of the Art

It has already been suggested that materials with form memory be used to command the disengaging of an appendage. Hence, document FR-A-2 667 842 describes a rotational mechanism in which an initial load is applied between two components connected to one another by ball bearings, during the launch of a spacecraft, so that the bearings are not damaged by the high mechanical stresses which occur at that time. This mechanism includes a component made of a material with form memory which, when heated above its transition temperature, brings about elongation. This elongation has the effect of separating the surfaces held in contact during the launch and of removing the initial load applied to the bearings in a way that allows relative rotation of the two components.

A mechanism of this type has numerous advantages. These advantages notably include reliability, the high level of the force supplied, the absence of impact and the non-polluting property.

When one wishes to integrate a device made of a material with form memory into any mechanism of the kind such as that described in document FR-A-2 667 842, it is currently necessary to adapt adjacent components so as to protect the device made of material with form memory during handling, and to link to it an electric heater and its power supply conductors, as well as thermal insulation means when this is necessary. This need for adaptation constitutes a drawback which hinders the use of such devices made of material with form memory, compared with more traditional concurrent techniques, such as pyrotechnic compounds, which can be used directly without any adaptation at all.

Furthermore, the only materials with form memory that are currently usable are irreversible materials, that is to say materials which cannot return to their initial state when they have once passed through their phase transition temperature. In itself this does not constitute a disadvantage when one wishes to produce an irreversible single actuation pushing device. However it could become one, notably in the application to a spacecraft, if there is a danger of passing through the phase transition temperature before the launch of the spacecraft. In effect the assembly of a device made of material with form memory which has already been used previously could have very serious consequences, possibly going so far as to prevent the carrying out of the mission initially planned.

SUMMARY OF THE INVENTION

The principal subject of the invention is a single actuation pushing device, driven by a material with form memory, also known as shape memory alloy, designed in such a way that it can be used, without particular adaptation, in the manner of a pyrotechnic compound. This pushing device is produced in such a way that it can only be assembled with the condition that the phase transition temperature of the material with form memory has not been previously passed through.

According to the invention, this result is obtained by means of a single actuation pushing device, characterized by the fact that it includes two annular components forming bosses, an annular device, made of a material with form memory, positioned between the two annular components, and means of heating the annular device, capable of causing an elongation of this device. Furthermore, the present invention includes means of thermally insulating the annular device, casing means, surrounding the annular device and the heating means, means of fixing the pushing device onto an external component and means of linking the annular component, normally holding them pressed against the annular device, before the elongation of that device, these linking means being automatically disconnected, by the effect of the elongation of the annular device. In order to prevent the pushing device from being assembled after the phase transition temperature of the annular device as been exceeded, the present invention includes means of preventing mistakes which are sensitive to the state of the linking means in order to prevent use of the fixing means when these linking means are disconnected by the effect of the elongation of the annular device.

In a first embodiment of the invention, the casing means include a skirt. This skirt can be integral with one of the annular components or mounted on this component by a connection with limited axial clearance, less than the elongation of the annular device produced by passing through the phase transition temperature of the material with form memory.

In a second embodiment of the invention, the casing means include two cylindrical skirts linked to each of the two annular components.

Preferably, the linking means include complementary areas shaped respectively on each of the annular components. these areas normally being housed one inside the other.

The complementary areas of these linking means can be shaped like truncated cones and include a male area shaped on tongues integral with a first of the annular components and capable of being deformed towards the interior during an elongation of the annular device. In this case, the fixing means include a passage that passes through the first annular component. This passage is obstructed, at least partially, by the tongues when they are deformed in such a way that these tongues form the means of preventing mistakes.

In the first embodiment of the invention and when the skirt is integral with one of the annular components, the fixing means can also include a thread formed on the outside of the skirt. The means preventing mistakes then include at least one sprung strip fixed by a first end in a groove formed in the skirt and whose second end is normally held by the second annular component in a drawn in position disengaging the thread. An elongation of the annular device has the effect of releasing the second end of the sprung strip, in such a way that this then takes up a protruding position, that prevents use of the thread.

In this case, the second end of the sprung strip advantageously carries a finger that passes through an opening formed in the skirt, to be normally engaged in a notch formed in the second annular component.

In the second embodiment of the invention, one of the cylindrical skirts is provided with slits, in a way that forms elastic grips normally engaged with the other skirt. These grips are released during an elongation of the annular device, so they are deformed towards the exterior in such a way that the elastic grips form the means of preventing mistakes.

The means of fixing the pushing device onto an external component can also include a cross member passing through the two annular components, fixed to one of these components, and fitted with a shoulder against which the other annular component is normally pressed in such a way that the cross member also forms said means of linking the annular components.

In this case, the cross member includes a zone of least resistance situated between the shoulder and an area for fixing the cross member onto the first component, the area of least resistance being capable of breaking during an elongation of the annular device.

The thermal insulation means can include devices put between the ends of the annular device and the annular components. These devices are either discs of a thermally insulating material or components comprising an internal end and an external end, joined one to another by a central body with a thermally resistant cross section.

Each of the annular components can also comprise an internal end and an external end, joined one to another by a central body with a thermally resistant cross section forming said means of thermal insulation.

Advantageously, the heating means include an electric heater surrounding the annular device, the electrical power supply conductors for this heater passing through one of the annular components.

BRIEF DESCRIPTION OF THE DRAWINGS

Different embodiments will now be described as non-limiting examples of the invention, making reference to the appended drawings, in which:

FIG. 2 illustrates the use of the pushing device in FIG. 1 in a stacking mechanism that might well be fitted to a spacecraft;

FIG. 3 is a longitudinal section view, comparable to FIG. 1, illustrating a second embodiment of a pushing device according to the invention;

DETAILED DESCRIPTION OF EMBODIMENTS

Figure 1:
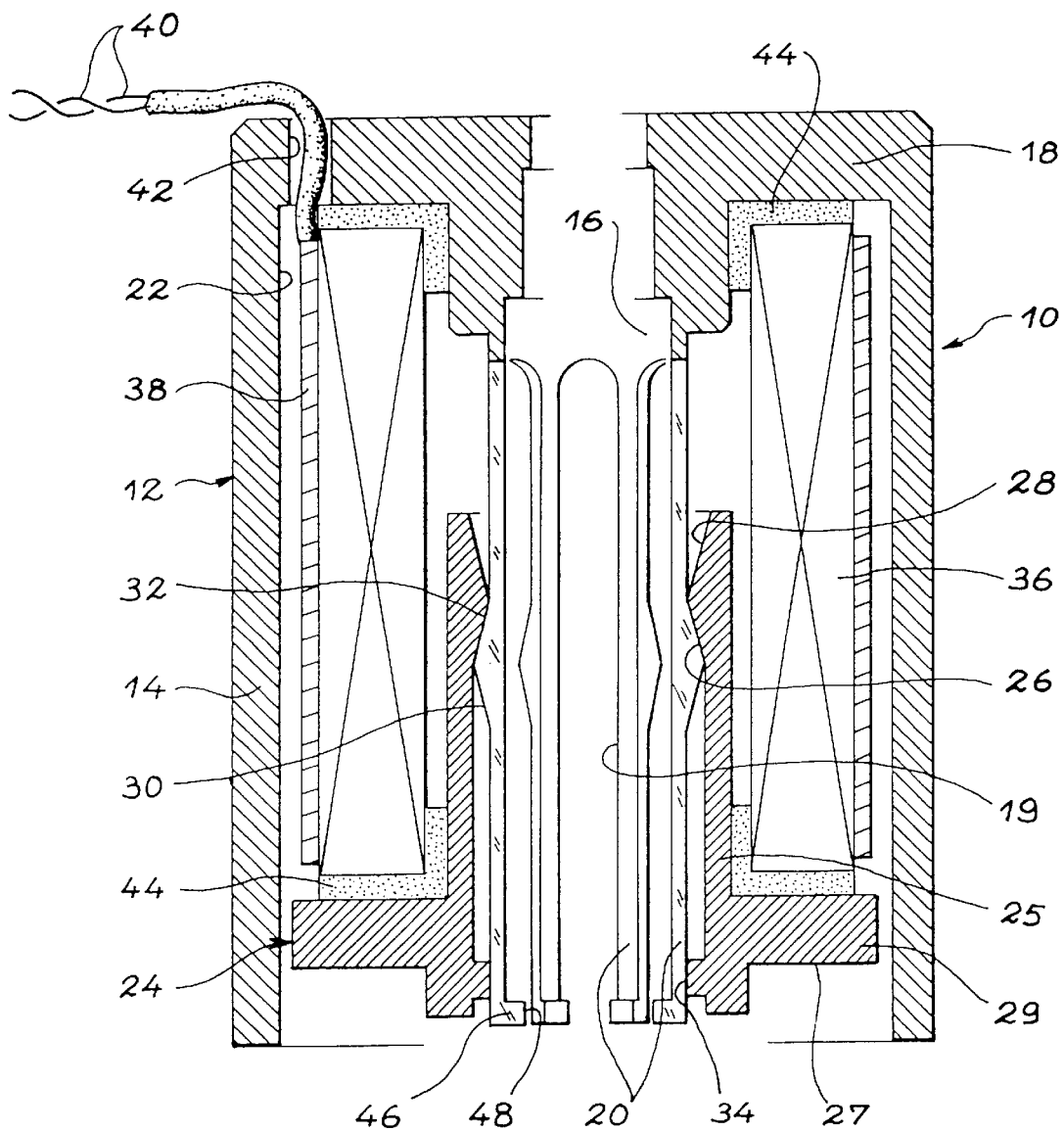
FIG. 1 is a longitudinal section view illustrating a first embodiment of a pushing device according to the invention.

In FIG. 1, reference number 10 designates in a general way, an irreversible single actuation pushing device according to the invention. This pushing device constitutes a ready to use component, that the user can put into any assembly, without having to create any particular arrangement.

The pushing device 10 includes a first annular component, forming a boss, made in one piece in the embodiment in FIG. 1. This component 12 can be produced in a material sufficiently rigid to transmit large thrust forces, while having good elasticity in its areas of least thickness. This material can normally be a metal.

Casing means, constituted by a cylindrical protective external skirt 14 are integral with the first component 12. The component 12 also includes an interior tube 16 and an end wall 18 linking two adjacent ends of the skirt 14 and the tube 16. The tube 16 is positioned coaxially with the skirt 14, inside it. The skirt 14 is slightly longer than the tube 16, in such a way that its end facing the wall 18 protrudes slightly beyond the corresponding end of the tube 16.

Over the major part of its length and up to its end facing the wall 18, the inside tube 16 includes slots 19, oriented parallel to the axis of the tube and forming between them, tongues 20 with reduced thickness. These tongues 20 are capable of being deformed elastically towards the interior as will be seen later.

Between the skirt 14, the tube 16 and the wall 18, the component 12 defines internally an annular void 22 which opens to the exterior at the end opposite the wall 18.

A second annular component 24 forming a boss is positioned in the open end of the annular void 22 in a way that at least partially obstructs this void. More precisely, the annular component 24 includes a central tubular part 25 mounted on the tongues 20, so that normally it is supported by the latter as illustrated in FIG. 1. To this end, the end of the tubular part 25 turned towards the wall 18 of component 12 includes on the inside an annular bulge the sides of which define two truncated conical surfaces 26 and 28 turned respectively towards the open end and towards the closed end of the annular void 22. In comparable fashion, the tongues 20 include, on their outside surface, an annular bulge whose sides define two truncated conical surfaces 30 and 32 turned respectively towards the open end and towards the closed end of the void 22. When the annular component 24 is positioned on the tongues 20, the annular surface 26 is normally pressed onto the annular surface 32 to define a state of rest illustrated in FIG. 1. The surfaces 26 and 32 thus define the means of linking components 12 and 24. The face 27 of component 24 turned towards the open end of the void 22 is then slightly recessed with respect to the plane containing the ends of the skirt 14 and the tongues 20.

In order to complete the guiding of the component 24 onto the tongues 20, it can be seen in FIG. 1 that this component 24 includes on the inside, at the end turned towards the open end of the void 22, a cylindrical projection 34 which normally slides over the external cylindrical surface of the tongues 20.

The pushing device 10 according to the invention further includes, inside the annular void 22, an annular device 36 made of a material with form memory. This material is chosen so that a raising of its temperature beyond a specific phase transition temperature results in an elongation of the annular device 36 by a specific length (a few mm) along its axis.

More precisely, the annular device 36 is positioned in the annular void 22 in such a way that one of its ends is pressed against the end wall 18 of the component 12 and that its opposite end is pressed against a part 29 with the shape of a disc, of component 24. This pressure is produced in such a way that the ends of the annular device 36 are both centred respectively on the part of the internal tube 16 adjacent the end wall 18 and on the tubular part 25 of the annular component 24. Consequently, an elongation of the annular device 36 due to it being heated beyond its phase transition temperature has the effect of pushing the annular component 24 towards the open end of the annular void 22.

The pushing device 10 according to the invention further includes means of heating the annular device 36, comprising, for example, an electric heater surrounding this annular device. The electric heater 38 can notably be stuck or pressed directly onto the material with form memory which the annular device 36 is made of. The electric power supply is provided by electrical conductors 40 which pass through a passage 42 formed in the end wall 18 of the component 12 to be connected onto an electrical plug (not shown) external to this component.

So that the heating of the annular device 36, during the time the electric heater 38 is switched on, is not transmitted to the outside of the pushing device 10, thermally insulating components are preferably placed respectively between the ends of the annular device 36 and the end wall 18 of the component 12 and the annular component 24. In the embodiment illustrated in FIG. 1, these thermally insulating components comprise discs 44, with an L-shaped section. These discs 44 are made of a thermally insulating material, of reduced thickness, capable of preventing the transfer of heat while providing a good transmission of the forces which are applied between the end wall 18 and the component 24 along the axis of the pushing device 10, when the annular device 36 increases in length.

The assembly of the pushing device 10 is easily carried out by successively positioning in the annular void 22 of component 12 the first thermally insulating disc 44, the annular device 36 carrying the electric heater 38, the second thermally insulating disc 44 and the annular component 24. When the latter is slipped onto the tongues 20, the truncated conical surface 28 formed on component 24 is pressed against the truncated conical surface 30 formed on the tongues, which has the effect of radially deforming the latter towards the interior until component 24 is clicked onto the tongues into the position illustrated in FIG. 1. In this rest state, the grips 46 formed on the ends of the tongues 20 are directed radially towards the interior, defining in component 12 an axial passage 48 which passes through the component over its entire length. As shown in FIG. 2, this axial passage is provided so that a fixing device such as a tie rod 50, a screw or a gudgeon etc., can be passed through it.

With the effect of an elongation of the annular device 36, caused by it being heated beyond the phase transition temperature of the material making it up, component 24 is displaced away from wall 18 of component 12, parallel to the axis of the pushing device 10. Due to the co-operation of the truncated conical surfaces 26 and 32, this displacement of component 24 has the effect of bending the tongues 20 towards the interior. The grips 46 then come closer to one another in such a way that the diameter of the passage 48 is considerably reduced. The tongues 20 with the grips 46 on their ends then constitute means for avoiding mistakes, preventing any use of the fixing means such as the tie rod 50 in FIG. 2. In effect, the cross section of the passage 48 is then quite insufficient to allow passage of this tie rod or of any analogous fixing device. Consequently, if the pushing device 10 has been actuated inadvertently, before it has been considered to have been placed in its final position, this positioning is impossible. This characteristic is particularly important for the use of the pushing device 10 on a spacecraft, since it allows one to be certain that the pushing device installed on the spacecraft is indeed in operational condition.

FIG. 2 diagrammatically illustrates, as an example, the assembly of the pushing device 10 from FIG. 1 between two components 52 and 54 that one wishes to be able to unstack and separate after the launch of the craft.

In this case, the open end of the skirt 14 of the casing 12 includes a flange or lugs 56, by which the casing 12 can be fixed onto component 52, for example, by means of screws 58. Furthermore, the tie rod 50 or any equivalent fixing device is used to clamp component 54 against component 52 while pressing on the end wall 18 of the casing 12. In the example shown, this clamping is ensured by the use of complementary truncated conical surfaces 60 and 62 formed respectively on components 52 and 54.

When the assembly has been carried out, between the face 27 of the annular component 24 turned towards the outside of the annular void 22 and the face opposite component 54, there is sufficient clearance for the initial load applied between components 52 and 54 through tie rod 50 not to be applied to the annular device 36. However this clearance is noticeably less than the elongation of the annular device 36 caused by passing through the phase transition temperature of the material which constitutes it.

When the electric heater 38 is switched on, passing through the phase transition temperature of the material constituting the annular device brings about the elongation of the latter. Under the effect of this elongation, component 24 presses against component 54. The latter is then pushed away from component 52 and from component 12 fixed onto component 52 by screws 58. This has the consequence of fracturing tie rod 50, which to this end includes an incipient fracture site 64 and a separation of the truncated conical surfaces 60 and 62 that were in contact. The release and separation of the two components 52 and 54 is thereby provided simultaneously. It should be noted that the fitting illustrated in FIG. 2 provides particularly effective stacking by means of complementary truncated conical surfaces, because the pushing device 10 guarantees the separation of these surfaces.

In FIG. 3, a second embodiment of the pushing device 10 has been shown. In this Figure, the pushing device is shown on the right hand side before its actuation and on the left hand side after its actuation.

In the embodiment in FIG. 3, the pushing device 10 has essentially the same characteristics as the pushing device previously described when referring to FIG. 1. The essential difference relates to the possibility of fixing component 12 onto an external component by a thread formed on the external surface of the skirt 14 of the casing of component 12 at the end of this skirt, and the addition of means of preventing mistakes linked to these complementary fixing means.

These means of preventing mistakes include at least one sprung strip 68 housed in a groove 70 formed in the external surface of the skirt 14, parallel to the axis of the pushing device 10. More precisely, the sprung strip 68 is fixed by the end nearest the wall 18 of component 12 into the bottom of the groove 70, for example by means of a rivet 72.

At the end nearest to the thread 66, the sprung strip 68 carries a finger 74 directed radially towards the interior. This finger 74 passes through an opening 76 formed in the skirt 14, to normally engage in an annular notch 78 formed in the face of the part 29 of the annular component 24 turned towards the end wall 18 of component 12.

To put it more precisely, when the pushing device 10 has not yet been actuated, the sprung strip 68 occupies a drawn in position, illustrated on the right hand side of FIG. 3, in which the finger 74 is hooked into the annular notch 78 of the component, thereby holding the sprung strip in the bottom of the groove 70. In these conditions, it is possible to screw in or to unscrew component 12 using thread 66.

In contrast to this, when the pushing device 10 has been actuated, component 24 is displaced away from the end wall 18 of component 12 in such a way that the finger 74 is no longer held in the annular notch 78. In these conditions and as shown on the left hand side of FIG. 3, the sprung strip 68 takes up its natural rest condition, in which the strip is slightly curved towards the exterior from its end fixed onto component 12 by rivet 72. Consequently, the opposite end of the sprung strip 68 projects beyond groove 70 and prevents component 12 being screwed onto an external component using thread 66.

Of course, the fixing means and the means of preventing mistakes described previously with reference to FIGS. 1 and 2 can be used at the same time as the fixing means and means of preventing mistakes which have just been described and which are illustrated in FIG. 3. Contrary to this, it is also possible to use these fixing means and means of preventing mistakes in isolation, without departing from the scope of the invention.

Figure 4:
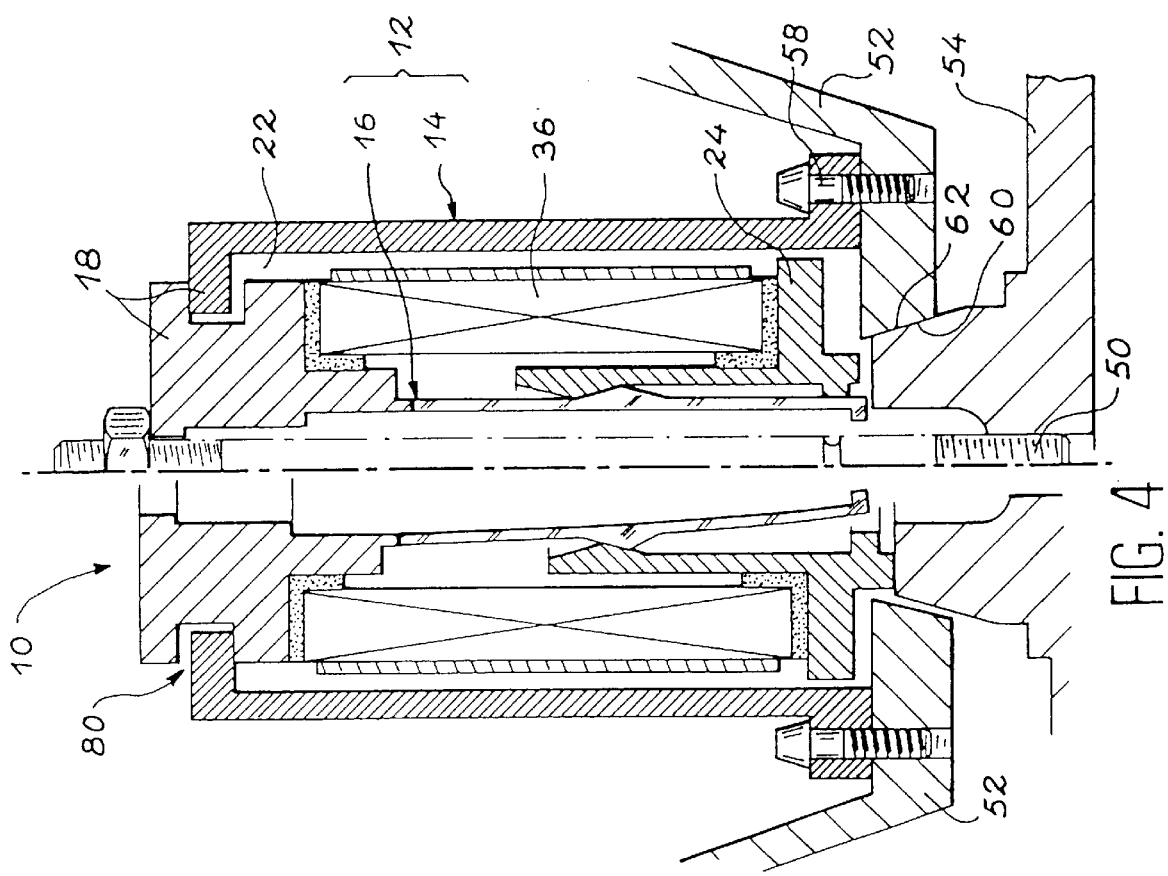
FIG. 4 is a section view, comparable to FIGS. 1 and 3, illustrating another embodiment of a pushing device according to the invention.

In FIG. 4, a pushing device is represented which illustrates a third embodiment of the invention. In this embodiment, the pushing device is distinguished essentially by the fact that, instead of allowing the simultaneous command of the unstacking and the separation of the surfaces in contact, it carries out these two operations in sequential fashion.

To this end, instead of being produced in a single unit, component 12 is formed, in this case from an internal tubular part 16 and an external tubular skirt which are joined to one another at the wall 18 by a link 80 that permits a limited displacement parallel to the axis of the pushing device, between the internal part 16 and the skirt 14. The limited axial clearance defined in this way by the link 80 is however, notably less than the elongation of the annular device 36 under the effect of the phase transition of the material which constitutes it.

Represented on the right hand side of FIG. 4 are the positions occupied by the different components constituting the pushing device 10 before its actuation while the same components are represented on the left hand side after actuation of the pushing device.

Hence, when the pushing device is used to release two components 52 and 54 as shown on the right hand side of FIG. 4, an assembly analogous to that of FIG. 2 is used. More precisely, the skirt 14 of component 12 is fixed onto component 52 by screws 58. Furthermore, a fixing device such as a tie rod 50 holds truncated conical surfaces 60 and 62 of components 52 and 54 pressed against one another. The external tubular part 16 of component 12 then occupies the position illustrated on the right hand side of FIG. 4, that is to say, the position furthest from the open end of the annular void 22. As previously, the annular component 24 is not then in contact with component 54.

When the pushing device 10 is actuated, component 24 presses on component 54 and thereby causes the fracture of tie rod 50 controlling its elongation.

In a second stage, continuation of the elongation of the annular device 36 causes a relative axial displacement between the skirt 14 and the external tubular part. This relative displacement provides the command for the separation of components 52 and 54, after the axial clearance defined by the link 80 has been taken up.

Figure 5:
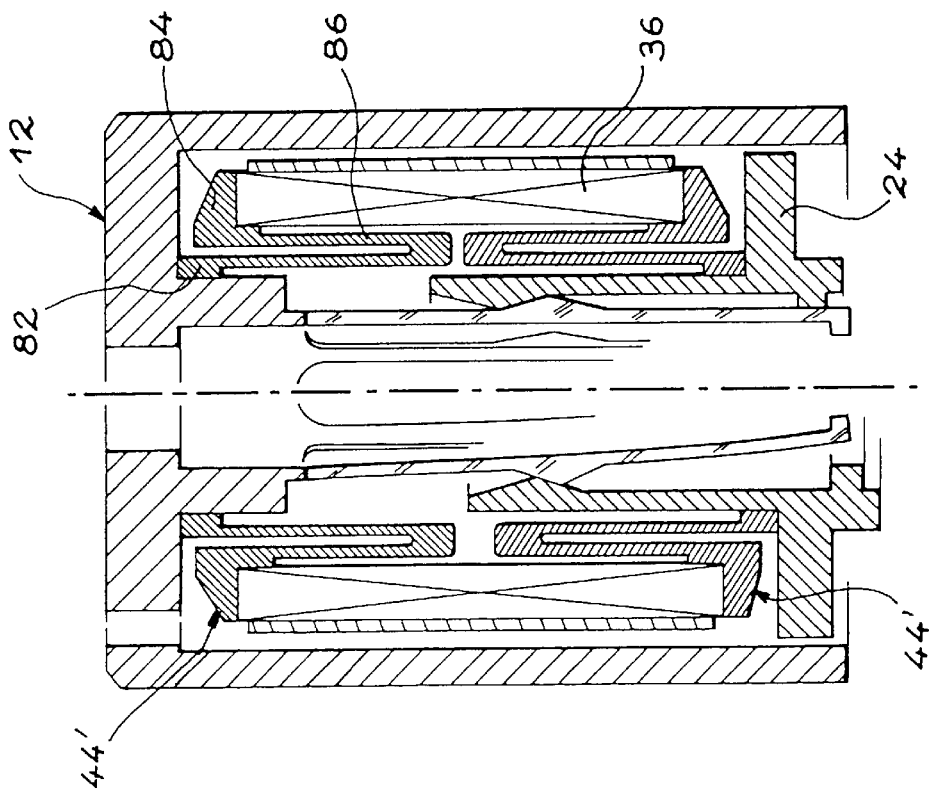
FIG. 5 is a section view, comparable to FIGS. 1, 3 and 4, illustrating yet another embodiment of the invention.

In FIG. 5, another embodiment of the invention has been shown which differs essentially from the embodiment previously described with reference to FIGS. 1 and 2 by the nature of the thermally insulating components which are placed respectively between the ends of the annular device 36 on the one hand and components 12 and 24 on the other hand.

To put it more precisely, instead of being made up of discs of small thickness made of thermally insulating material, components 44' are constituted in this case by components made of any material having good mechanical strength such as a metal. The thermal insulation is obtained by giving the components 44' a particular shape that provides good thermal resistance between the surfaces of these components which are in contact with the annular device 36 and the surfaces of these components which are in contact with components 12 and 24.

To put it more precisely, each of the components 44' carries an internal end flange 82 which presses against either component 24 or component 12, an external end flange 84 which presses against the annular device 36 and a central body 86 which has a cross section of an oblate U, that is to say small thickness and long length. The section given to the central body 86 gives the components 44' a thermally resistant character, between flanges 82 and 84.

This embodiment allows one to ensure the transmission of large mechanical forces, without the heat transmitted to the annular device 36 being transferred to adjacent components of the assembly.

Figure 6:
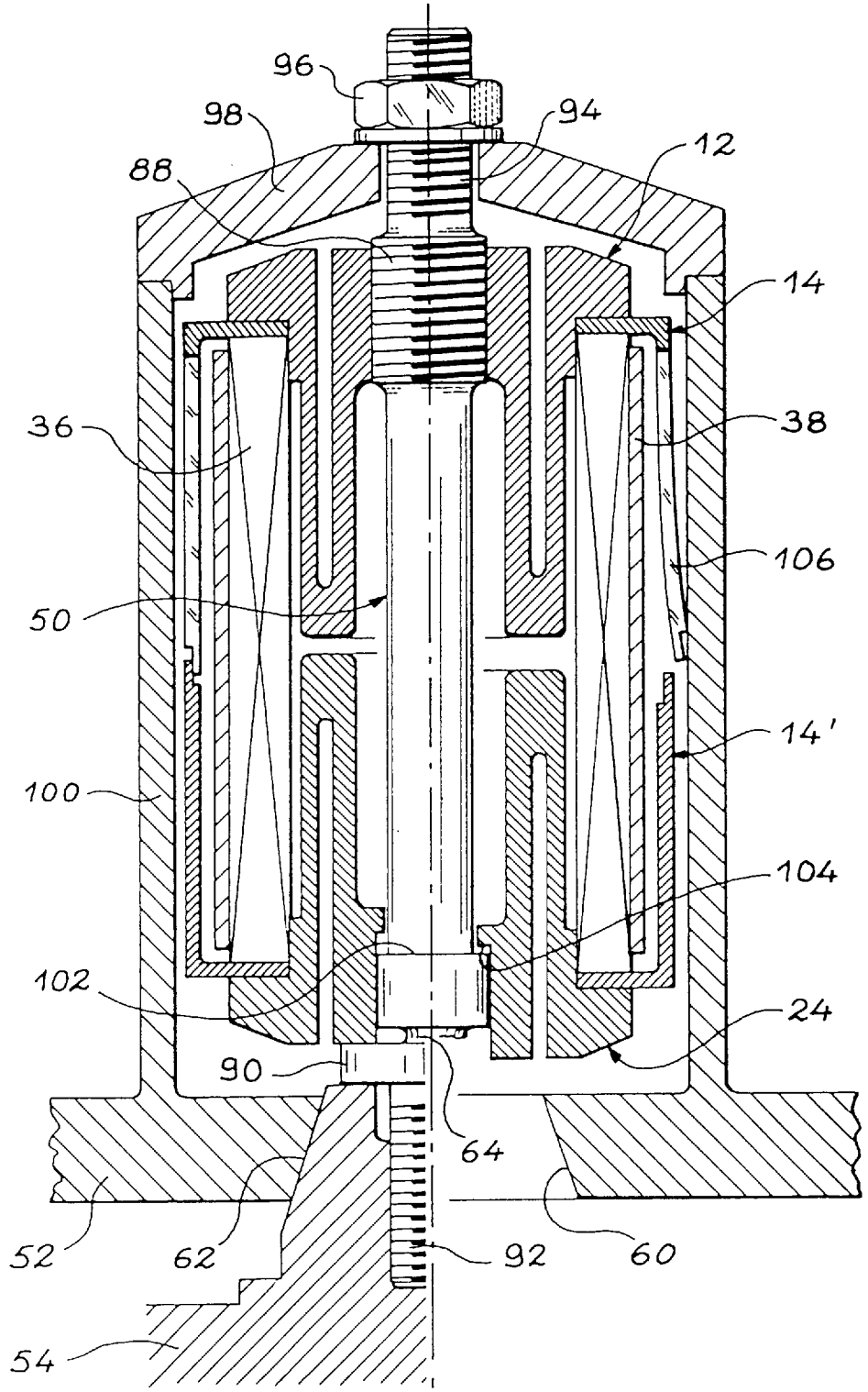
FIG. 6 is a view comparable to FIG. 2, illustrating the use of yet another embodiment of the invention.

In another embodiment illustrated in FIG. 6, the pushing device 10 includes two annular components 12 and 24 forming bosses identical to one another. Furthermore, these components 12 and 14 have the same structure as the thermally insulating components 44' which have just been described with reference to FIG. 5. Consequently, the annular components 12 and 24 also constitute, in this case, thermal insulation means for the annular device 36, made of a material with form memory, and positioned between these components.

Taking into account the particular structure of the annular components 12 and 24, the linking means by which these components are normally held pressed against the annular device 36 include, in this case, a cross-member 50 which is then an integral part of the pushing device 10. This cross-member 50 has the shape of a gudgeon which passes coaxially through components 12 and 24 as well as the annular device 36.

In order to provide the link between components 12 and 24, the cross-member 50 includes a thread 88 on which component 12 is screwed, then stuck and a collar 90 against which component 24 is normally pressed. More precisely, the thread 88 is screwed and stuck into the internal end flange of component 12 and the collar 90 is pressed against the internal end flange of component 24.

The cross-member 50 furthermore forms a fixing means by which the pushing device 10 can be fixed onto external components 52 and 54. To this end, the crossmember 50 includes, beyond the collar 90, a threaded end 92 provided to be screwed into the external component 54 until the collar 90 becomes pressed against component 54. The opposite end 94 of the crossmember 50, also threaded, receives a nut 96 provided to be pressed against the detachable cover 98 of a casing 100 provided, on the external component 52, to receive the pushing device 10.

To put it more precisely, the pushing device 10 is first positioned inside the casing 100 without its cover 98. The cross-member 50 is then screwed into component 54, provided to be in contact with component 52 through the complementary truncated conical surfaces 60 and 62. After putting on the cover 98, the nut 96 is tightened which has the effect of pressing surfaces 60 and 62 against one another.

Close to the collar 90, on the side of the thread 88, the cross-member 50 includes a region with a reduced diameter 64 constituting an incipient fracture site. This region 64 fractures during the elongation of the annular device 36, causing the release and the separation of components 52 and 54.

In FIG. 6, a cross-member 50 is shown provided with a shoulder 102 between the region 64 and the thread 88. This shoulder 102 is situated opposite a shoulder 104 formed in component 104. This layout allows one to avoid any risk of the component 24 escaping from component 52 after fracture of the crossmember 50.

In the embodiment in FIG. 6, instead of comprising a skirt linked to component 12, the casing means include two cylindrical skirts 14 and 14' linked respectively to components 12 and 24. These skirts totally surround the annular device 36 and its heater 38 when the pushing device 10 has not been actuated, as is illustrated on the left hand side of FIG. 6.

Each of the skirts 14 and 14' includes a disc shaped end, which projects towards the interior in such a way as to be gripped between the annular device 36 and the external end flange of the component 12, 24 which corresponds to it.

Furthermore, the skirt 14 is provided with longitudinal slits 106 outside of its disc shaped end already mentioned. It thereby forms elastic grips, which tend to deform towards the exterior as has been shown on the right hand side of FIG. 6.

The grips of skirt 14 are normally held by skirt 14' (without slits) in an approximately cylindrical configuration illustrated on the left hand side of FIG. 6, when no elongation whatsoever of the annular device 36 has occurred. In effect, the end of skirt 14' then caps the end of the grips of skirt 14, in order to prevent them taking up their natural shape.

When an elongation of the annular device 36 occurs, the ends of the grips of skirt 14 escape from the end of skirt 14'. The grips move apart towards the exterior and then constitute means of preventing mistakes which prevent the pushing device 10 being put into the casing 100 without its cover 98.

Of course, the different embodiments described above can be combined with one another, without departing from the scope of the invention. Hence, the components 44' in FIG. 5 can be used in place of components 44 in the embodiments in FIGS. 1, 3 and 4.

The description given above shows that the pushing device according to the invention constitutes a ready to use, single actuation device, allowing one to carry out an irreversible linear displacement of reduced amplitude (a few millimetres) with a great force (several thousand Newtons), and includes passive means for preventing mistakes so that a pushing device having functioned could not be used again in error.

We claim:

1. A single actuation pushing device including:
   two annular components forming bosses;
   an annular device, made of a material with form memory under compressive prestress, positioned between the two annular components;
   means of heating the annular device, capable of causing an elongation of this device;
   means of thermally insulating the annular device;
   casing means, surrounding the annular device and the heating means;
   means of fixing the pushing device onto an external component;
   means of linking the annular components, normally holding them pressed against the annular device, before the elongation of that device, these linking means being automatically disconnected, by the effect of the elongation of the annular device;
   means of preventing mistakes which are sensitive to the state of the linking means in order to prevent use of the fixing means when these linking means are disconnected by the effect of the elongation of the annular device.

2. A pushing device according to claim 1, in which the casing means include a skirt integral with one of the annular components.

3. A pushing device according to claim 2, in which the fixing means include a thread formed on the end of the skirt, and the means of preventing mistakes include at least one sprung strip fixed by a first end into a groove formed in the skirt, and the second end of which is normally held in a drawn in position by the second annular component, freeing the thread for use, an elongation of the annular device having the effect of releasing the second end of this sprung strip, in such a way that it then takes up a projecting position that prevents use of the thread.

4. A pushing device according to claim 1, in which the casing means include a skirt mounted on one of the annular components by a link with a limited axial clearance, less than said elongation of the annular device.

5. A pushing device according to claim 1, in which the casing means include two cylindrical skirts joined to each of the two annular components.

6. A pushing device according to claim 5, in which the second end of the sprung strip carries a finger that passes through an opening formed in the skirt, in order normally to be engaged in a notch formed in at least one of the annular components.

7. A pushing device according to claim 5, in which one of the cylindrical skirts is provided with slits, in such a way that elastic grips are formed, normally engaged with the other skirt, these grips being released during elongation of the annular device, so as to deform them towards the exterior, in such a way that the elastic grips form the means of preventing mistakes.

8. A pushing device according to claim 1, in which the linking means include complementary areas formed respectively on each of the annular components, these areas normally being housed one inside the other.

9. A pushing device according to claim 8, in which the complementary areas are in the shape of a truncated cone and include a male area formed on tongues integral with a first of the annular components and capable of being deformed towards the interior during elongation of the annular device, the fixing means including a passage that passes through the first annular component, this passage being obstructed at least partially, by said tongues when they are deformed, in such a way that these tongues form the means of preventing mistakes.

10. A pushing device according to claim 1, in which the means of fixing the pushing device onto an external component include a cross member passing through the two annular components, fixed to one of these components, and fitted with a shoulder against which the other annular component is normally pressed, in such a way that the cross member also forms said means of linking the annular components.

11. A pushing device according to claim 10, in which the cross member includes a zone of least resistance situated between the shoulder and an area for fixing the cross member onto the first component, in such a way that the zone of least resistance is capable of breaking during an elongation of the annular device.

12. A pushing device according to claim 1, in which the means of thermal insulation include discs of a thermally insulating material placed between the ends of the annular device and the annular components.

13. A pushing device according to claim 1, in which the means of thermal insulation include components placed between the ends of the annular device and the annular components, each of these components comprising an internal end and an external end, joined one to another by a central body with a thermally resistant cross section.

14. A pushing device according to claim 1, in which each of the annular components has an internal end and external end, joined one to another by a central body with a thermally resistant cross section forming said means of thermal insulation.

15. A pushing device according to claim 1, in which the heating means include an electric heater surrounding the annular device, the electrical power supply conductors for this heater passing through one of the annular components.

* * * * *

UNITED STATES PATENT AND TRADEMARK OFFICE
CERTIFICATE OF CORRECTION

PATENT NO. : 5,829,253
DATED : November 3, 1998
INVENTOR(S) : Christian F. L. LONG, et al.

It is certified that error appears in the above-identified patent and that said Letters Patent is hereby corrected as shown below:

On the title page, item [73] should be:

--[73] Assignee: AEROSPATIALE Société Nationale
                 Industrielle, Paris Cedex, France--

Signed and Sealed this

Eleventh Day of May, 1999

Attest:

Q. TODD DICKINSON

Attesting Officer

Acting Commissioner of Patents and Trademarks